United States Patent [19]

Takada

[11] Patent Number: 5,178,041
[45] Date of Patent: Jan. 12, 1993

[54] CONTROL SYSTEM FOR ENGINES AND AUTOMATIC TRANSMISSIONS

[75] Inventor: Mitsuru Takada, Aichi, Japan

[73] Assignee: Toyota Jidosha Kabushiki Kaisha, Toyota, Japan

[21] Appl. No.: 729,684

[22] Filed: Jul. 15, 1991

[30] Foreign Application Priority Data

Jul. 16, 1990 [JP] Japan .................................. 2-187542
Jul. 16, 1990 [JP] Japan .................................. 2-187543
Jul. 16, 1990 [JP] Japan .................................. 2-187544

[51] Int. Cl.$^5$ ...................... B60K 41/04; B60K 41/06
[52] U.S. Cl. ........................................ 74/857; 74/858; 74/859; 74/860; 74/872; 74/878
[58] Field of Search ................ 74/857, 858, 859, 860, 74/872, 878

[56] References Cited

U.S. PATENT DOCUMENTS

| | | | |
|---|---|---|---|
| 3,789,702 | 2/1974 | Price | 74/859 |
| 4,596,164 | 6/1986 | Hasegawa et al. | 74/859 X |
| 4,732,130 | 3/1988 | Suzuki | 74/860 X |
| 4,823,642 | 4/1989 | Iwaki et al. | 74/860 |
| 4,972,737 | 11/1990 | Makimoto | 74/859 |
| 5,086,667 | 2/1992 | Katayama et al. | 74/857 X |
| 5,101,687 | 4/1992 | Iwatsuki et al. | 74/872 X |
| 5,125,292 | 6/1992 | Matsuoka et al. | 74/860 X |

FOREIGN PATENT DOCUMENTS

57-97945 6/1982 Japan .................................. 74/857
62-215157 9/1987 Japan .

OTHER PUBLICATIONS

"Technology for Automobile" vol. 38, No. 9, 1984, Summary of Development in Lean Combustion Engine.

Primary Examiner—Richard Lorence
Assistant Examiner—David E. Henn
Attorney, Agent, or Firm—Oblon, Spivak, McClelland, Maier & Neustadt

[57] ABSTRACT

A control system for controlling both a lean combustion engine equipped with a swirl control valve and an automatic transmission. The control system includes a shift detector for detecting that a shift is being executed in the automatic transmission and a valve control inhibitor for inhibiting the switching the ON/OFF state of the swirl control valve in the course of the shift in the automatic transmission. A shift inhibitor inhibits the shift for a constant time period in case the ON/OFF state of the swirl control valve is switched. A regulation level changer changes the regulation level of the oil pressure of the automatic transmission in accordance with the ON/OFF state of the swirl control valve.

2 Claims, 6 Drawing Sheets

CONTROL SYSTEM FOR ENGINES AND AUTOMATIC TRANSMISSIONS

BACKGROUND OF THE INVENTION

The present invention relates to a system for controlling both an engine having high torque fluctuations, when the ON/OFF state of a control valve disposed in an intake port is switched, and an automatic transmission connected to the engine.

As is well known in the art, an automatic transmission for vehicles is set to a predetermined one of gear stages when the power transmission path of a gear train is changed by a friction device including clutches and brakes. This friction device has its load (or torque) capacity varied with not only the coefficients of friction and the diameters of frictional members but also the pressure of engagement (i.e., the line pressure). This oil pressure is controlled in accordance with the load to be applied to the friction device. When in shifting, on the other hand, not only the engine speed but also the speeds of various rotating members such as gears also vary. For this shift, therefore, the friction device is caused to slip by changing the oil pressure applied to them gently for a predetermined time period so that the inertial energy accompanying the change in the rotational speeds may be absorbed to prevent an abrupt change in the torque of an output shaft, namely the shift shocks.

The aforementioned engagement pressure is controlled through a change in the level of pressure regulation by applying a pilot pressure corresponding to the engine load to a regulator valve for regulating the oil pressure generated by a hydraulic pump. Specifically, either the throttle pressure to be fed from a throttle valve having its regulation level varied by a throttle cam or the throttle pressure sent from a linear solenoid valve to be controlled according to the throttle opening is applied as the pilot pressure to the regulator valve to change the regulation level. On the other hand, the oil pressure for engaging the friction device may be controlled when in shifting by applying either the oil pressure (i.e., the line pressure) regulated by the aforementioned regulator valve or the oil pressure coming from an accumulator control valve to the back pressure chamber of an accumulator. Incidentally, an example of changing the regulation level by using the linear solenoid valve is disclosed in Japanese Patent Laid-Open No. 215157/1987.

In the aforementioned ordinary control method existing in the prior art, the line pressure will rise as the throttle opening increases, so that the torque capacity of the friction device is augmented whereas the oil pressure in shifting remains at a relatively high level. If, on the contrary, the throttle opening decreases so that the engine torque falls, the line pressure also drops, and then the engagements or release of the friction device in shifting are timed, as expected, not to deteriorate the shift shocks.

Incidentally, the engine connected to the automatic transmission does not always have its output torque changed continuously. In case, therefore, the engine torque change is discontinuous, special controls are required.

The engine falling in this category can be exemplified by the (lean combustion) engine which adopts a lean combustion system, as disclosed in Vol. 38, No. 9 of "Automobile Technology". In this lean combustion engine, an improvement in the fuel economy under a light load and a high output under a high load are made compatible by keeping an air/fuel ratio at a high level while the throttle opening is at or below a predetermined level (i.e., under the light load). In a lean range (having a higher air/fuel ratio), however, it is required to stabilize the combustion in the engine cylinder and to improve the combustion efficiency. For this requirement, the bisected intake port has its one half shaped into a helical swirl port and its other equipped with a control valve (e.g., a swirl control valve, as will be abbreviated into "SCV"). Under a light load, this swirl control valve is closed to establish a swirling flow in the cylinder to ensure the lean combustion. Since, however, the suction is restricted with the swirl control valve being closed, a sufficient output performance is achieved at a throttle opening larger than a predetermined value (i.e., under a high load) by opening the swirl control valve and by reducing the air/fuel ratio to the stoichiometric level or the power level.

FIG. 10 is a diagram plotting the relations between the output torque of the aforementioned lean combustion engine and the throttle opening. A thick solid line appearing in FIG. 10 indicates the actual engine torque. Moreover, a line ① indicates the torque characteristics when the air/fuel ratio is as high as 21 for the lean combustion, in which the aforementioned swirl control valve is closed. On the other hand, a line ② or ③ indicates the torque characteristics for a relatively lean combustion having an air/fuel ratio of 17 or 16. Moreover, a line ④ indicates the torque characteristics for the stoichiometric combustion having an air/fuel ratio of 14.5. Still moreover, a line ⑤ indicates the torque characteristics for the power combustion having an air/fuel ratio of about 12.5.

As shown in FIG. 10, the aforementioned lean combustion engine is subjected to a lean combustion, in which the air/fuel ratio is set at about 21 with the throttle opening $T_A$ being no higher than $T_{A1}$, as indicated in FIG. 10. The engine torque is continuously increased by changing the air/fuel ratio gradually to 7 or 16 while the throttle opening $T_A$ is at a level between $T_{A1}$ and $T_{A2}$ of FIG. 10. When the throttle opening $T_A$ exceeds $T_{A2}$, the engine torque in the wide opening range is retained partly by opening the swirl control valve and partly by reducing the air/fuel ratio to the power level. In the burning state having the swirl control valve opened, however, the engine torque is discontinuously changed together with the air/fuel ratio between $T_1$ and $T_2$, as seen from FIG. 10.

In the prior art, however, the switching of the ON/OFF of the swirl control valve and the shift of the automatic transmission are accomplished independently of each other. In case these operations take place simultaneously, the shift shocks are enlarged due to the overlap of the changes in both the engine torque caused by switching the swirl control valve and the output shaft torque caused by the inertial torque in shifting. In case, moreover, the swirl control valve is switched, the engine torque is highly changed even if the throttle opening does not change, as has been described hereinbefore. In the conventional method, by which the line pressure and the accumulator back pressure are controlled according to the throttle opening, these two pressures will become unsuitable for the engine torque (or the input torque to the automatic transmission). As a result, if a shift occurs in this state, its shocks may grow excessive, and still the worse the friction members may lose their durability.

SUMMARY OF THE INVENTION

A major object of the present invention is to prevent the shift shocks of an automatic transmission which is connected to an engine having a discontinuously changing output torque.

Another object of the present invention is to improve the durability of the friction device of the automatic transmission which is connected to the engine having its output torque changed discontinuously.

Still another object of the present invention is to provide a system capable of properly controlling both an engine equipped with a control valve for controlling the ON/OFF of one of intake ports formed in each cylinder and an automatic transmission connected to the engine.

In order to achieve these objects, the control system of the present invention is provided with means for inhibiting the ON/OFF of a control valve for causing the discontinuous change in the output torque, while a shift is being executed in the automatic transmission.

In accordance with another structure of the present invention, the control system is provided with means for inhibiting the shift in the automatic transmission for a predetermined time period in case the ON/OFF state of the control valve is switched to cause the discontinuous change in the output torque. In this structure, the shift is not executed before the oil pressure grows suitable for the engine torque. As a result, it is possible to prevent the shift shocks and the excessive slippage of the friction device.

In accordance with still another structure of the present invention, the control system is provided with regulation level change means for changing the regulation level of the oil pressure in accordance with the ON/OFF state of the control valve for causing the discontinuous change in the output torque. The structure can be modified such that the control valve for causing the discontinuous change in the output torque is switched after the regulation level has been changed. With these structures, neither the shift shocks are enlarged, nor does the friction device slip excessively, because the oil pressure of the automatic transmission is suited for the output torque after the control valve has been switched.

The above and further objects and novel features of the present invention will more fully appear from the following detailed description when the same is read with reference to the accompanying drawings. It is to be expressly understood, however, that the drawings are for the purpose of illustration only and be not intended as a definition of the limits of the present invention.

DETAILED DESCRIPTION OF THE PREFERRED EMBODIMENTS

Figure 1:
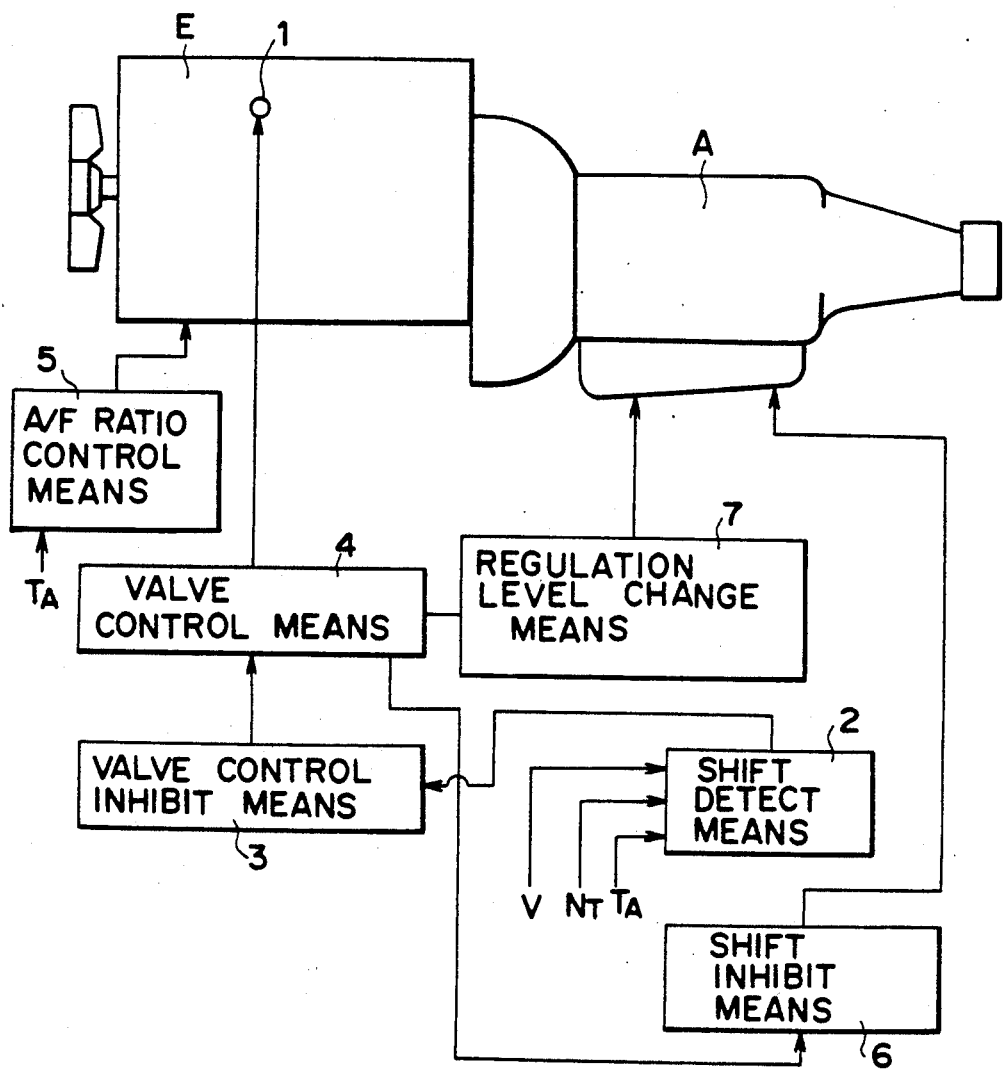
FIG. 1 is a block diagram showing a basic structure of the control system according to the present invention.
Figure 2:
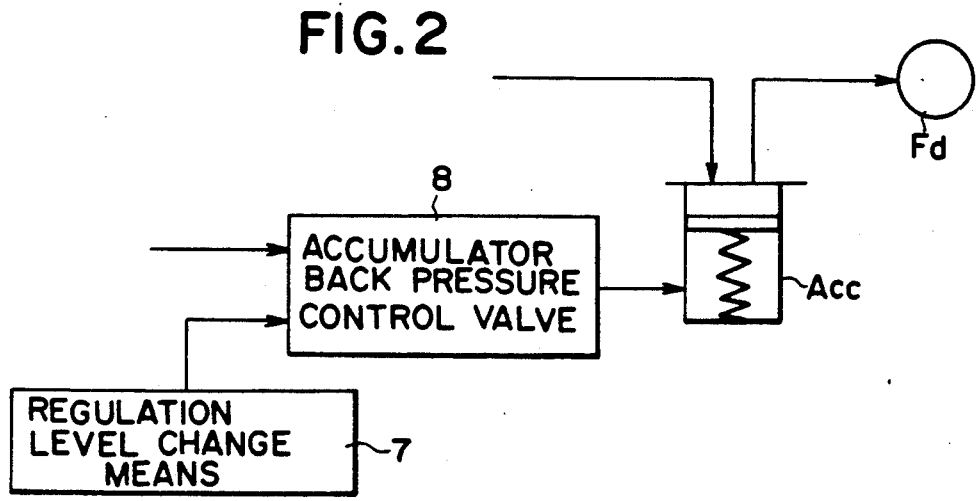
FIG. 2 is a schematic diagram showing one example of pressure regulating means.

First of all, a basic structure will be described in the following. In FIG. 1, an engine E is of the type in which each cylinder is formed with a plurality of intake ports and in which a control valve 1 is disposed in any of the intake ports so that the engine torque may be discontinuously changed by switching the ON/OFF state of the control valve 1. This engine E is exemplified by the lean combustion engine which is equipped with the aforementioned swirl control valve. To this engine E, there is connected an automatic transmission A for executing one of shifts. This shift execution is detected by shift detect means 2. This shift detect means 2 detects the shift execution in terms of signals such as a vehicle speed V, a throttle opening $T_A$ or a turbine speed $N_T$, and outputs its signal to valve control inhibit means 3. This valve control inhibit means 3 inhibits the change or switching of the ON/OFF state of the control valve 1 in the engine E in response to the shift execution signal coming from the shift detect means 2. A valve control means 4 is set to open the control valve 1 if the throttle opening $T_A$ is above a predetermined value, and to close the valve 1 if the throttle opening $T_A$ is below that value. There is also provided air/fuel ratio control means 5 for controlling the air/fuel ratio in accordance with the engine load and accordingly the ON/OFF of the control valve 1. Specifically, the air/fuel ratio control means 5 increases the air/fuel ratio if the control valve 1 is closed, and decreases the air/fuel ratio if the control valve 1 is open. With the aforementioned valve control means 4, there are connected shift inhibit means 6 and regulation level change means 7. Of these, the shift inhibit means 6 inhibits the shift execution of the automatic transmission A while the valve control means 4 is executing the switching of the control valve 1, even if it is decided that a shift be executed in accordance with changes in the vehicle condition such as the vehicle speed V or the throttle opening $T_A$. On the other hand, the regulation level change means 7 changes the regulation level of the oil pressure in the automatic transmission A. Specifically, the automatic transmission A is equipped, as schematically shown in FIG. 2, with a friction device Fd to be engaged by the oil pressure, an accumulator Acc connected with the friction device Fd, and an accumulator back pressure control valve 8 for controlling the back pressure of the accumulator Acc. These accumulator Acc and accumulator back pressure control valve 8 constitute together the pressure regulate means. This pressure regulate means has its specific structure disclosed in "LEXUS LS400 1990 New Car Feature" (which is published by Toyota Motors), for example. Moreover, the regulation level change means 7 is constructed to change the regulation level by changing the pilot pressure of the accumulator back pressure control valve 8.

In the control system shown in FIG. 1, therefore, the switching of the ON/OFF state of the control valve 1 in the engine E is decided and executed in terms of the throttle opening and the intake vacuum. On the other hand, the shift in the automatic transmission A is decided and executed according to the throttle opening $T_A$ and the vehicle speed V, for example. A shift is detected, if executed in the automatic transmission A, by the shift detect means 2 so that this means 2 is outputted to the valve control inhibit means 3. Then, this valve control inhibit means 3 inhibits the switching of the ON/OFF state of the control valve 1 even if the engine state such as throttle opening or the intake vacuum is such as to switch the ON/OFF state of the control valve 1. As a result, the discontinuous change in the engine torque is not caused in the course of the shift so that the shift shocks can be prevented from becoming worse.

If, on the other hand, it is decided by the valve control means 4 in terms of the throttle opening $T_A$ and so on that the ON/OFF state of the control valve 1 be switched, the regulation level change means 7 changes the regulation level of the oil pressure in the automatic transmission A, i.e., the back pressure of the accumulator Acc, and the valve control means 4 then switches the ON/OFF state of the control valve 1. After the switching of the ON/OFF state of the control valve 1 has been executed, the shift inhibit means 6 inhibits the shift at the automatic transmission A till a predetermined time elapses.

In case, therefore, the control valve 1 is switched to change the engine torque discontinuously, the oil pressure in the automatic transmission A has already been changed so that the friction device Fd can be prevented from having insufficient force due to low torque and accordingly from slipping. Since, moreover, the switching of the control valve 1 and the shift are prevented from occuring simultaneously, no high shift shock will be caused. In case, still moreover, the oil pressure is controlled in accordance with the output of the engine E, the shift is not executed before the oil pressure is varied by changing the engine output in accordance with the switching of the control valve 1. As a result, the friction device Fd has its torque capacity suited for the torque applied to the friction device Fd. As a result, it is possible to prevent the excessive slippage of the friction device Fd and the shift shocks.

Figure 3:
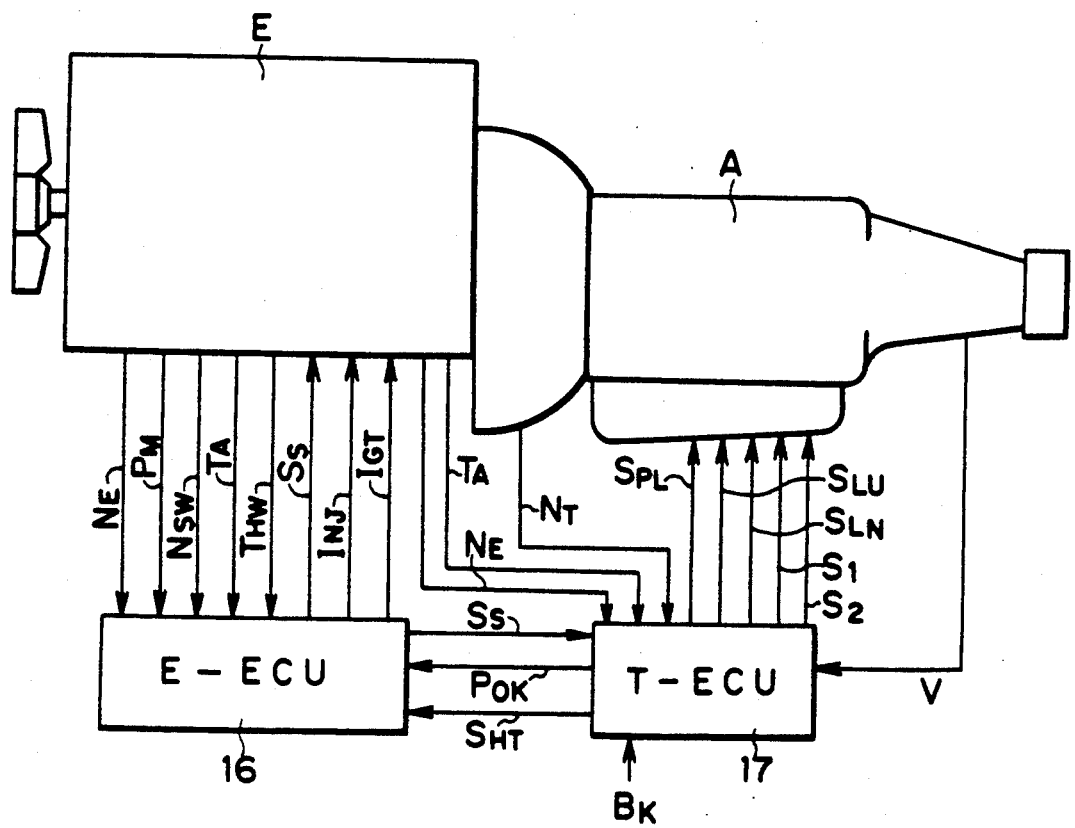
FIG. 3 is a diagram showing the structure of a control system according to one embodiment of the present invention.
Figure 4:
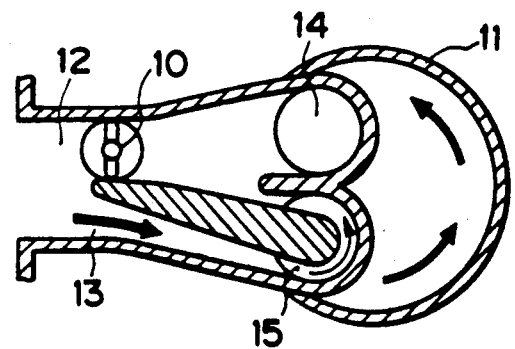
FIG. 4 is a schematic diagram showing a swirl control valve in a lean combustion engine.
Figure 10:
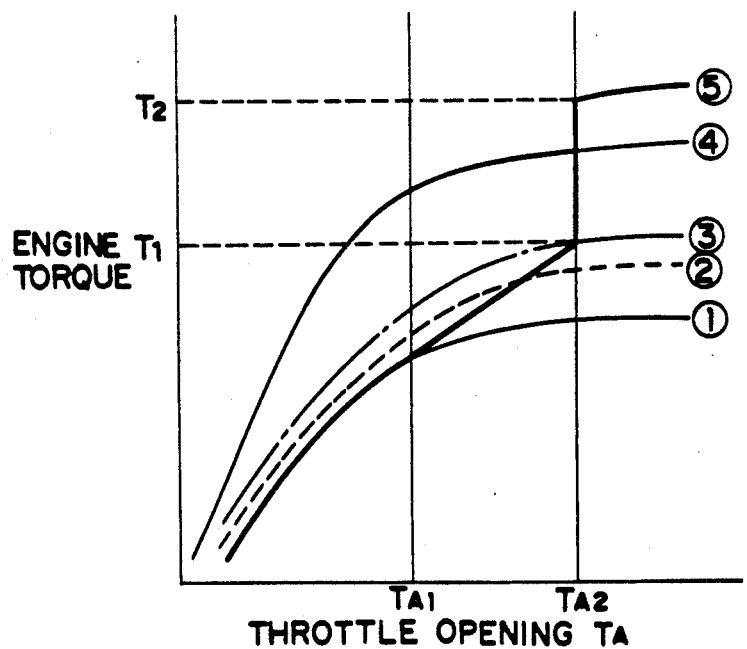
FIG. 10 is a diagram plotting the output characteristics of the lean combustion engine which is equipped with the swirl control valve.

FIG. 3 shows a more specific structure, as will be described in connection with the engine E and the automatic transmission A connected to the former in accordance with the present invention. The engine E is constructed to have its output torque changed discontinuously by the control valve disposed in the air intake system, as will be exemplified by a swirl control valve 10 shown in FIG. 4. As shown, one cylinder 11 is equipped with two intake ports 12 and 13 and two intake valves 14 and 15. The one intake port 12 is equipped with the swirl control valve 10 for opening or closing it. If the swirl control valve 10 is closed, the intake air will flow, as indicated by arrows in FIG. 4, into the cylinder 11 to establish a strong swirl while turning about the stem of the one intake valve 15. If the swirl control valve 10 is opened, on the contrary, the intake air flows into both intake ports 12 and 13. In the engine E thus constructed, the air/fuel ratio is controlled together with the control of the intake air by the swirl control valve 10. Specifically, a lean combustion is effected under a low load by increasing the air/fuel ratio and by closing the swirl control valve 10. Under a high load, on the contrary, a stoichiometric combustion is effected by setting the air/fuel ratio to the stoichiometric value and by opening the swirl control valve 10. As a result, the engine E can achieve the aforementioned torque characteristics, as indicated by the thick solid line in FIG. 10.

In FIG. 3, reference numeral 16 designates an electronic control unit (as will be abbreviated into "E-ECU") for controlling the engine E. This electronic control unit 16 is made receptive of signals including an engine speed $N_E$, an intake manifold vacuum $P_M$, a neutral switch signal $N_{SW}$, the throttle opening $T_A$ and an engine water temperature $T_{HW}$ to output signals including a signal $S_S$ for controlling the swirl control valve 10, a fuel injection signal $I_{NJ}$ and an igniter signal $I_{GT}$.

On the other hand, the automatic transmission A has a well-known structure, in which it can set one of gear stages by means of the friction device including clutches and brakes and can freely control the control pressure such as the line pressure or the accumulator back pressure in an electric manner by means of the linear solenoid valve. This automatic transmission A is controlled by an electronic control unit (as will be abbreviated into "T-ECU"). This electronic control unit 17 is made receptive of signals including the vehicle speed V, the engine speed $N_E$, the turbine speed $N_T$, the throttle opening $T_A$ and a brake signal $B_K$ to output its signals to a line pressure controlling solenoid valve $S_{PL}$, a lock-up solenoid valve $S_{LU}$, an accumulator back pressure solenoid valve $S_{LN}$ and shift solenoid valves $S_1$ and $S_2$.

The electronic control units 16 and 17 described above are electrically connected with each other for the following operations. In case the automatic transmission A is executing the shifting operation, the electronic control unit 17 therefor outputs a signal $S_{HT}$ to the electronic control unit 16 for the engine E so that the latter unit 16 inhibits the switching of the ON/OFF state of the swirl control valve 10.

On the other hand, the electronic control unit 16 for the engine E outputs a signal $S_S$ indicating the ON/OFF state of the swirl control valve 10, and the electronic control unit 17 for the automatic transmission A then outputs a signal $P_{OK}$ indicating the end of setting the line pressure and the accumulator back pressure.

The oil pressures such as the line pressure and the accumulator back pressure in the automatic transmission A are controlled on the basis of two kinds of maps. In case the swirl control valve 10 changes between its OFF and ON states, the engine torque discontinuously changes, and the torque also changes generally in a manner to correspond to the throttle opening. Thus, the electronic control unit 17 for the automatic transmission A controls the oil pressure by using the following maps interchangeably: either a two-dimensional map M1 dictated by the throttle opening and the engine speed with the swirl control valve 10 being closed or a one-dimensional map M1 dictated by the intake manifold vacuum; and either a two-dimensional map M2 dictated by the throttle opening and the engine speed with the swirl control valve 10 being opened or a one-dimensional map M2 dictated by the intake manifold vacuum.

The ON/OFF inhibition of the swirl control valve 10 in the shifting operation of the aforementioned system will be described with reference to FIGS. 5A to 5E.

Figure 5A:
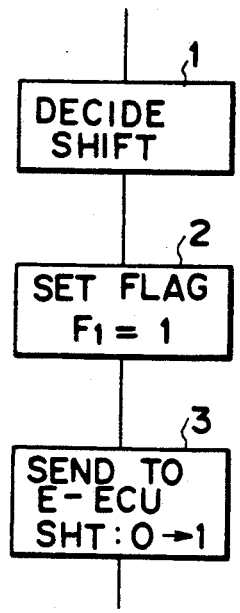
FIGS. 5A to 5E are flow charts showing a control routine for inhibiting the change of the swirl control valve in shifting.
Figure 5B:
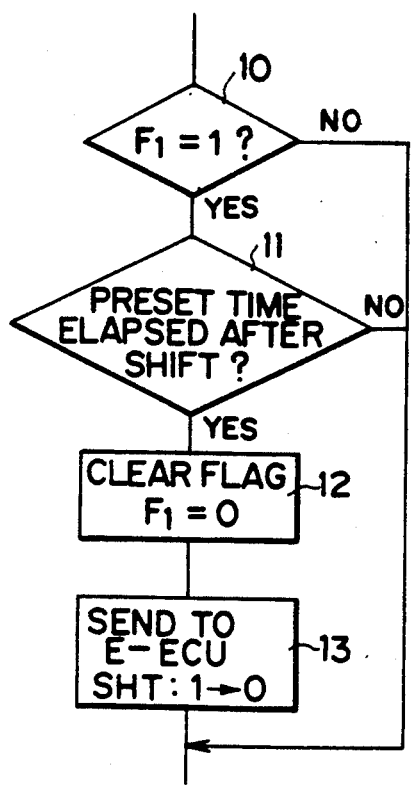

FIG. 5A shows the control at the start of a shift by the electronic control unit 17 for the automatic transmission A. If it is decided (at Step 1) in terms of input signals including the throttle opening $T_A$ and the vehicle speed V that the shift should be executed, a flag F1 indicating that the shift is being executed is set to "1" (at Step 2). Then, a signal "$S_{HT}:0\rightarrow1$" indicating the shifting operation is outputted (at Step 3) to the electronic control unit 16 for the engine E. At the end of this shift, on the other hand, the electronic control unit 17 for the automatic transmission A decides (at Step 10) whether or not the flag F1 is at "1". If NO, the routine is returned. If YES, the routine advances to Step 11, at which it is decided whether or not a preset time has elapsed after the end of the shift. If NO, the routine is returned. If YES, the routine advances to Step 12, at which the flag F1 is cleared. Then, a signal "$S_{HT}:1\rightarrow0$" indicating that the end of the shift is outputted (at Step 13) to the electronic control unit 16 for the engine E.

Figure 5C:
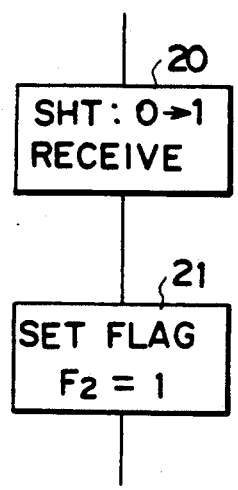
Figure 5D:
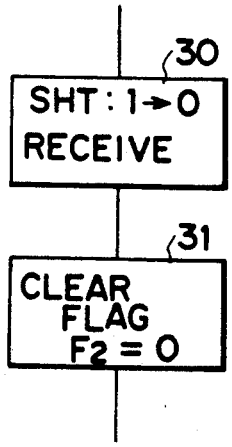
Figure 5E:
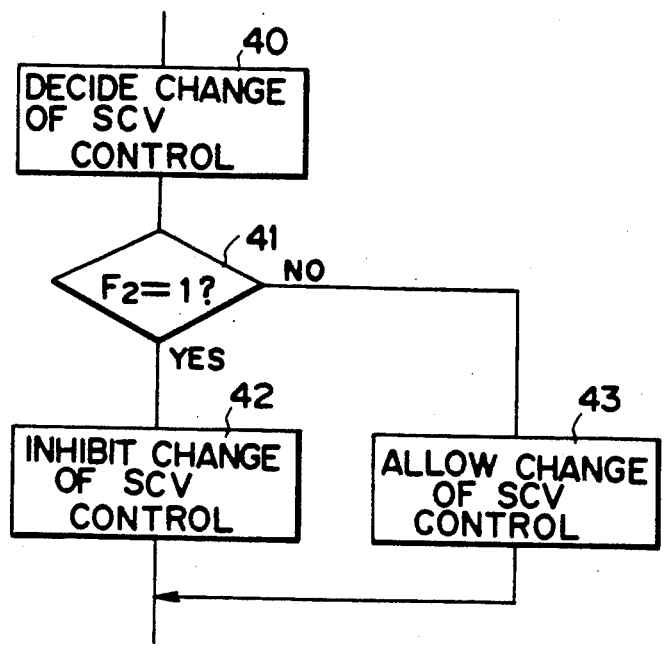

If, on the other hand, the electronic control unit 16 receives (at Step 20) a signal "$S_{HT}:0\rightarrow1$" indicating the shifting operation from the electronic control unit 17, as shown in FIG. 5C, it sets (Step 21) a flag F2 indicating the shifting operation to "1". In response to the signal "$S_{HT}:1\rightarrow0$" (at Step 30), the electronic control unit 16 clears (at Step 31) the flag F2, as shown in FIG. 3I.

If it is decided (at Step 40) by the electronic control unit 16 for the engine E in accordance with the engine condition such as the throttle opening $T_A$ or the intake manifold vacuum $P_M$ that the ON/OFF state of the swirl control valve (SCV) 10 should be switched, it is decided (at Step 41) whether or not the aforementioned flag F2 is at "1". If YES, a shift will be effected in the automatic transmission A. Hence, the change or switching of the ON/OFF state of the swirl control valve 10 is inhibited (at Step 42). If NO at the Step 41, on the contrary, no shift is executed at the automatic transmission A. Hence, the switching of the ON/OFF state of the swirl control valve 10 is allowed (at Step 43).

In the controls thus far described, therefore, the ON/OFF state of the swirl control valve 10 in the engine E is not switched if the automatic transmission A is in the course of a shifting operation. As a result, the load and torque to be applied to the friction device including the clutches and brakes of the automatic transmission A are not abruptly changed to avoid any mismatch between the oil pressures engaging the friction device and the load and torque. As a result, the shift shocks are kept from growing worse.

Figure 6:
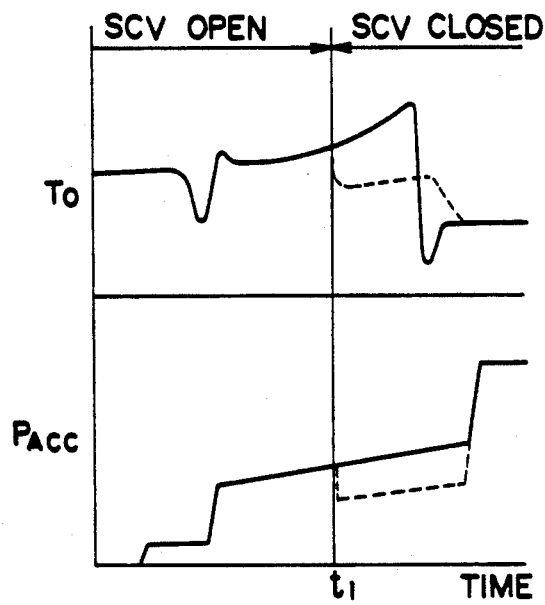
FIG. 6 is a diagram plotting the changes in an accumulator back pressure and an output shaft torque when the swirl control valve is changed in the course of the shift from its open to closed states.
Figure 7:
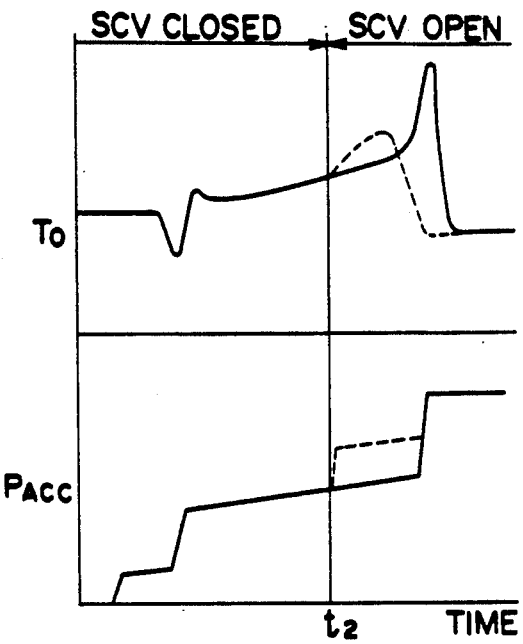
FIG. 7 is a diagram plotting the changes in an accumulator back pressure and an output shaft torque when the swirl control valve is changed in the course of the shift from its closed to open states.

More specifically, FIG. 6 illustrates the case in which the swirl control valve 10 is switched from its open to closed states in the course of the shifting operation. If, for example, the swirl control valve 10 is switched from ON to OFF at a time $t_1$ in the course of a power-on upshift, the accumulator back pressure $P_{ACC}$, which should drop along a dash line in accordance with the reduction of the engine torque, does not drop due to a delay in the response (as indicated by a solid line). As a result, the engagement of the friction device is so premature as to fluctuate the output shaft torque $T_O$ seriously, as indicated by the solid line, thereby to cause the shift shocks. On the other hand, FIG. 7 illustrates the case in which the swirl control valve is switched from its closed to open states in the shifting course. If, for example, the swirl control valve is switched from OFF to ON at a time $t_2$ in the course of a power-on upshift, the accumulator back pressure $P_{ACC}$, which should rise along a dash line in accordance with the increase in the engine torque, does not rise due to a delay in the response (as indicated by a solid line). As a result, the torque capacity of the corresponding friction device at the time of the power-on upshift is so low in the accumulator region that the shift is not completed in the accumulator region. Thus, the accumulator has its piston moved to hit the limit (or end) position thereby to cause serious shift shocks.

However, the control system of the present invention can be freed from any excessive shift shock, because the swirl control valve 10 is neither opened nor closed in the course of a shifting operation so that the engine torque does not fluctuate.

Next, the shift inhibiting control in accordance with the switching of the swirl control valve 10 will be described in the following with reference to FIGS. 8A to 8D.

Figure 8A:
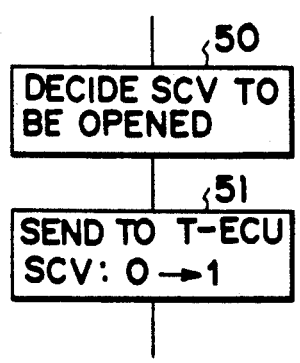
FIGS. 8A to 8D are flow charts showing a control routine for inhibiting a shift while the swirl control valve is being switched.
Figure 8B:
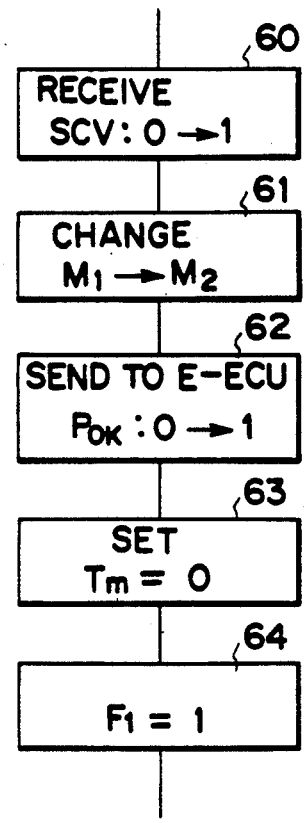
Figure 8C:
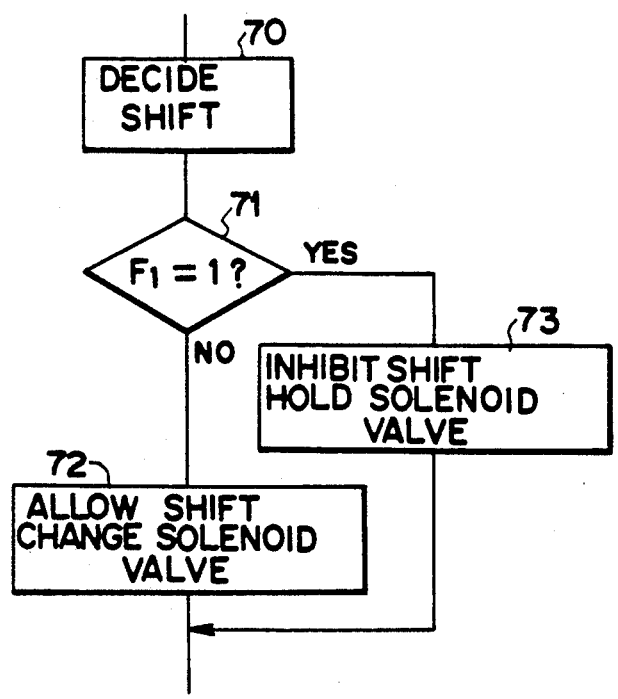
Figure 8D:
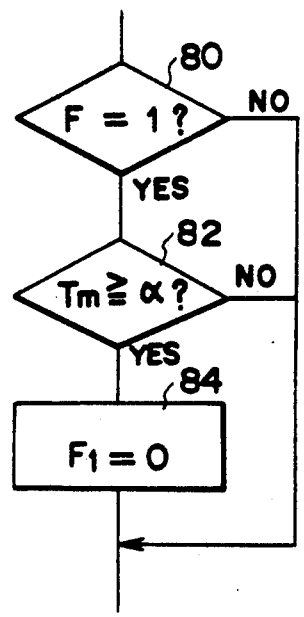
Figure 9A:
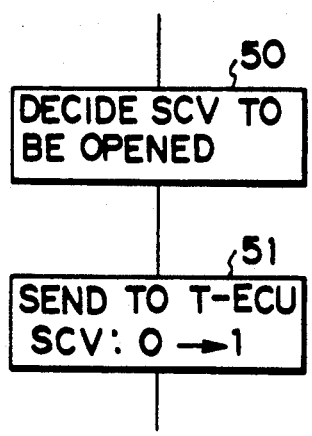
FIGS. 9A to 9D are flow charts showing a control routine for changing the regulation level when the swirl control valve is switched.
Figure 9B:
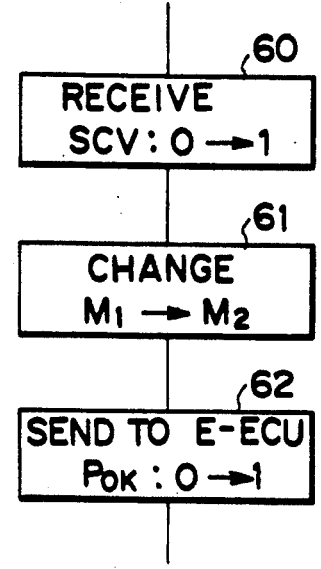
Figure 9C:
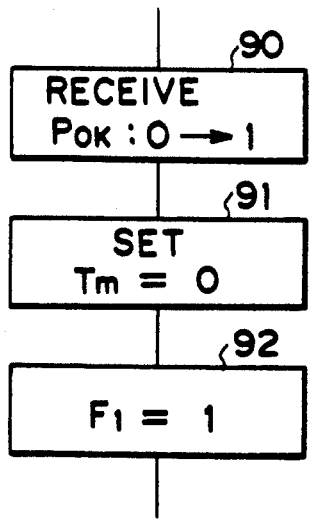
Figure 9D:
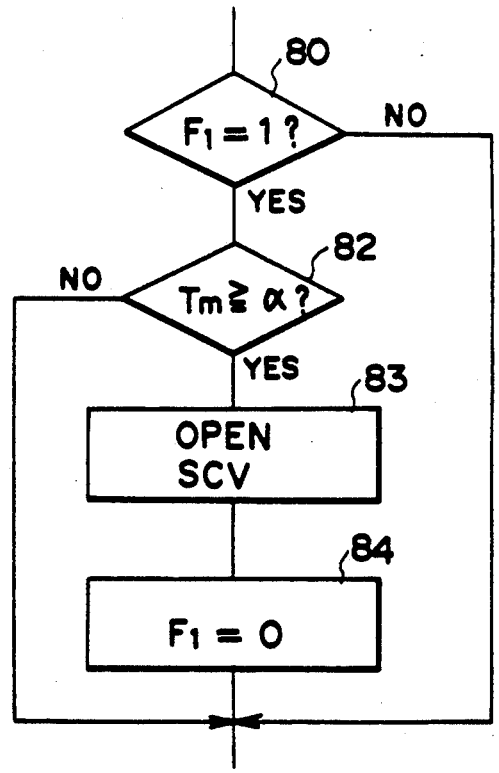

As shown in FIG. 8A, it is decided (at Step 50) by the electronic control unit 16 according to the throttle opening $T_A$ that the swirl control valve 10 should be switched from its closed to open states. Then, the electronic control unit 16 sends (at Step 51) a signal "$SCV:0\rightarrow1$" indicating the execution of the decision to the electronic control unit 17 for the automatic transmission A. If, on the other hand, this electronic control unit 17 receives (at Step 60) the signal "$SCV:0\rightarrow1$", it changes (at Step 61) the map for controlling the line pressure and the accumulator back pressure from the aforementioned map M1 to M2, and outputs not only a command signal for changing the control of the oil pressure based on the map M2, i.e., the regulation level of the oil pressure but also (at Step 62) the signal "$P_{OK}:0\rightarrow1$" indicating the start of changing the regulation level to the electronic control unit 16 for the engine E. Next, a timer Tm is set at Step 63, and the flag F1 indicating that the timer Tm is counting the time period is set (at Step 64) to "1". In this state, the shift is decided (at Step 70 of FIG. 8C), and it is decided (at Step 71) whether or not the flag F1 is at "1". If NO, it means that the counting operation of the timer Tm has been completed, namely, that the preset time has elapsed from the outputting of the command signal for changing the regulation level of the oil pressure. Then, the shift is allowed (at Step 72), and the signal is outputted to the necessary shifting solenoid valve to execute the shift. If the answer of Step 71 is YES, on the other hand, it means that the timer Tm is in the course of the counting operation and that the preset time has not elapsed yet from the outputting of the command signal for changing the regulation level of the oil pressure. Then, the shift is inhibited (at Step 73), and the individual shifting solenoid valves are held as they are. In the routine (of FIG. 8D) for controlling the counting operation of the timer Tm, moreover, it is decided (at Step 80) whether or not the flag F1 is at "1". If YES, it is decided (at Step 82) whether or not the counted value of the timer Tm is at a preset value $\alpha$. If YES, the flag F1 is reset (at Step 84) to zero. If NO at the decisions of Step 80 and 82, the routine is returned.

The aforementioned time period α counted by the timer Tm has a duration estimating the delay of the oil pressure in response and is expressed by a constant or a variable according to the oil temperature. Hence, the shift is inhibited till the line pressure or the accumulator back pressure rises to a level according to the map M2. As a result, the oil pressure is suited for the engine torque at the instant for the actual shift, so that neither the shift shocks grow excessive nor does proceed the wear of the friction members undergo wear.

Incidentally, the controls shown in FIGS. 8A to 8D correspond to the case, in which the swirl control valve 10 is switched from the closed to open states. Despite this fact, however, the system of the present invention can also be applied to the contrary case in which the swirl control valve 10 is switched from the open to closed states.

In the control system of the present invention, the oil pressure level of the automatic transmission A can also be controlled prior to the switching of the ON/OFF of the swirl control valve 10. This control will be exemplified in the following with reference to FIGS. 9A to 9D.

In the electronic control unit 16 for the engine E, more specifically, it is decided (at Step 50) according to the throttle opening $T_A$ that the swirl control valve 10 should be switched from its closed to open states. Then, the electronic control unit 16 sends (at Step 51) the signal "SCV:0→1" indicating the execution of that decision to the electronic control unit 17 for the automatic transmission A. In response to that signal "SCV:0→1" (at Step 60), on the other hand, the electronic control unit 17 interchanges (at Step 61) the map for controlling the line pressure and the accumulator back pressure from the aforementioned map M1 to M2, and outputs not only the command signal for changing the control of the oil pressure, i.e., the regulation level of the oil pressure according to the M2, but also (at Step 62) the signal "$P_{OK}$:0→1" indicating the start of changing the regulation level to the electronic control unit 16. In response to the signal "$P_{OK}$:0→1" (at Step 90), the electronic control unit 16 sets the timer Tm (at Step 91) and then the flag F1 to "1" (at Step 92). This flag F1 indicates that the preset delay time is being measured. Whether or not the flag F1 is at "1" is decided (at Step 80) in the routine for controlling the ON/OFF of the swirl control valve 10. If NO, the routine is returned. If YES, the routine advances to Step 82, at which it is decided whether or not the time period α has elapsed. If the answer is NO, the routine is returned to await lapse of the time period α. If YES, on the contrary, the swirl control valve 10 is switched (at Step 83) from the closed to open states, and the flag F1 is reset to zero (at Step 84).

The aforementioned time period α to be counted by the timer Tm has a duration corresponding to an estimated delay of the oil pressure in response and is a constant or a variable according to the oil temperature. As a result, the rise of the line pressure or the accumulator back pressure to a level according to the map M2 is timed with the increase of the engine torque to be caused by opening the swirl control valve 10.

According to the controls thus far described, the oil pressure is controlled according to the map M1 when the engine is under a light load with the swirl control valve 10 being closed. Under a heavy load with the swirl control valve 10 being open, the oil pressure is controlled according to the map M2 for the higher regulation level. As a result, the oil pressure is stepwise varied in accordance with the stepwise fluctuation of the engine torque so that it can correspond to the engine torque. Thus, it is possible to prevent the deterioration of the shift shocks and the excessive wear of the friction members in advance.

Moreover, the swirl control valve 10 is switched after the predetermined time period has elapsed after the output of the command signal for interchanging the maps, i.e., for changing the regulation level. As a result, less influences are produced due to the delay of the oil pressure in response. Thus, it is also possible to prevent the deterioration due to shift shocks, the excessive wear of the friction members, and the power loss.

The embodiment thus far described is directed to the so-called "lean combustion engine". This engine may also be exemplified by an engine having its air/fuel ratio raised by increasing either the amount of intake air or the amount of exhaust gases to be recirculated.

Moreover, the engine to be connected to the automatic transmission and sought for as a target of the present invention should not be limited to the structure, in which the intake passage is divided into plurality of passages, in which the control valve is disposed in one of the divided passages and turned on or off to vary the output torque discontinuously and in which the control valve is the swirl control valve.

The advantages to be obtained by the present invention will be described in the following. Since the engine torque is neither discontinuously fluctuated in the course of shifting the automatic transmission nor is shift in the automatic transmission executed if the engine torque is discontinuously fluctuated, it is possible to prevent serious shift shocks without fail. Moreover, the oil pressure is raised or dropped by having its regulation level changed in the automatic transmission in case the ON/OFF state of the control valve is to be switched. As a result, the oil pressure in the automatic transmission is optimized, even if the engine torque is discontinuously fluctuated, it is possible to prevent the shift shocks and the deterioration of the durability of the friction device, which might otherwise be caused due to the excessive slippage or mistimed engagement of the friction device.

What is claimed is:

1. A control system for controlling both an engine having a plurality of cylinders, a plurality of intake ports for each of said cylinders, a plurality of intake valves for opening or closing said intake ports, and a control valve for opening or closing one of the intake ports of each of said cylinders; and an automatic transmission connected to said engine, said control system comprising:

valve control means for opening said control valve when an engine load is high, and for closing said control valve when the engine load is low;

air/fuel ratio control means for making an air/fuel ratio when said control valve is closed higher than that when said control valve is open;

shift detect means for detecting that a shift is being executed in said automatic transmission; and valve control inhibit means for inhibiting the switching of the ON/OFF state of said control valve in the course of the shift in said automatic transmission.

2. A control method of controlling both an engine having a plurality of cylinders, a plurality of intake ports for each of said cylinders, a plurality of intake valves for opening or closing said intake ports, and a control valve for opening or closing one of the intake ports of each of said cylinders; and an automatic transmission connected to said engine, said method comprising the step of:

inhibiting the switching of the ON/OFF state of said control valve in the course of a shift in said automatic transmission.

* * * * *